Patented Aug. 29, 1939

2,170,950

UNITED STATES PATENT OFFICE 2,170,950

RESINS FROM PHENOLIC COMPOSITIONS AND ESTERS OF ANACARDIC ACID

Emil E. Novotny, Oak Lane, Pa., assignor to Durite Plastics, Incorporated, Philadelphia, Pa., a corporation of Pennsylvania No Drawing. Application May 6, 1937,
Serial No. 141,182

14 Claims. (Cl. 260—24)

This invention relates to the art of making synthetic resins.

In a concurrently filed application (application Serial No. 141,183), I have described a distinctively new class of substances derived from the shell liquids of the cashew and marking nuts. In accordance with the disclosure of said copending application, this new class of substances is produced by reacting anacardic acid or the shell liquids of the cashew and marking nuts with one or more fusible, resinous substances containing reactive phenolic hydroxyl groups in the absence of appreciable amounts of free aldehydes. Catalysts or condensing agents may be used to assist the reaction but are not at all necessary. The reaction can be readily controlled and can be stopped at any stage of condensation or polymerization to produce uniform products ranging in consistency from more or less viscous liquids suitable for the manufacture of coating, impregnating and cementing materials to grindably hard, fusible resins suitable for molding or the fabrication of shaped articles. These products are capable of being further reacted, condensed or polymerized with or without additional reagents such as catalysts, condensing agents or hardening agents to form ultimate infusible products.

The present invention is in the nature of an improvement on the invention disclosed in the copending application, and is based in part upon the discovery or observation that the esters of anacardic acid can be made to react with the resinous substances mentioned in the foregoing application in much the same manner as the free anacardic acid or the shell liquids of the cashew and marking nuts but with unexpected and greatly improved results.

As has been pointed out in the copending application previously referred to, there are certain very important advantages in reacting anacardic acid or the shell liquids of the cashew and marking nuts with resinous substances in the preparation of synthetic resins. There are certain additional important advantages in using the esters of anacardic acid instead of the free acid or the shell liquids of the cashew and marking nuts. For instance, in the case of the free anacardic acid or the shell liquids the number of ultimate infusible reaction products is limited by the number of available resinous substances having a reactive phenolic hydroxyl group. There is no such limitation in the case of the anacardic esters. There is a definite ultimate infusible reaction product for each anacardic ester and each ultimate product has its own specific physical and chemical properties in addition to those properties which are common to the class of ultimate infusible anacardic ester-resin reaction products. In other words, the ultimate product obtained by reacting the ethyl ester differs in certain respects from the ultimate product obtained by reacting the methyl ester, which in turn differs in certain respects from the ultimate products obtained by reacting the butyl and amyl esters. It should also be borne in mind that for each ultimate infusible product there is a group of initial and intermediate fusible reaction products, each of which has its individual properties. Hence, it follows that the anacardic ester-resin reaction products can be produced in a range of physical and chemical characteristics that appears well nigh limitless, in very marked contrast to the reaction products obtainable from the cashew and marking nut liquids or the free anacardic acid. The possible number of distinctive intermediate and ultimate products can be further increased indefinitely by mixing two or more esters of anacardic acid and then reacting the blended esters with the resinous substance. Instead of blending the esters, it is possible to blend the initial or intermediate reaction products of two or more different esters and then to continue the reaction to a further degree of condensation or polymerization.

Briefly stated, the method of the invention consists in mixing an ester of anacardic acid with one or more resinous substances containing reactive phenolic hydroxyl groups and permitting the materials to react under suitably controlled conditions until a desired stage of reaction, condensation or polymerization is reached.

The ester may be a crude ester or mixture of crude esters made by esterifying cashew nut shell liquid. The esterified liquid may be used directly without separating out the non-anacardic acid material. It is within the purview of the present disclosure to utilize a pure ester or a mixture of pure esters.

As in the case of the copending application previously referred to, the resinous substance may be either a natural or a synthetic product, provided it contains one or more reactive phenolic hydroxyl groups. Among the natural resinous substances which have been found suitable may be mentioned gum accroides and dragon's blood. The permanently fusible resinous phenol condensation products of the Novolak, shellac substitute and Saliretin types are given as examples of synthetic resinous substances which have given satisfactory results. Non-resinous substances which are readily converted to fusible resins may be used instead of the resinous substances, provided, of course, that they contain reactive phenolic hydroxyl groups. As examples of such substances may be mentioned the class of phenol alcohols such as saligenin.

In view of the foregoing, the term "resin" will be used in the specification and claims to include not only the synthetic and natural resins which are suitable for use in the present process but also such normally non-resinous substances which, like phenol alcohol, engender or are readily converted into resinous substances and which in either their non-resinous or resinous forms are suitable for my purpose.

The reaction can be carried out with or without the assistance of a catalyst or condensing agent, it being essential, as has already been pointed out, that the reaction be carried out in the absence of appreciable amounts of free aldehydes. The presence of free aldehydes in appreciable amounts appears to render it difficult to control the reaction, substantial amounts of rubbery substances being formed which are dispersed throughout the reaction mixture. The formation of these rubbery substances is wholly undesirable and is particularly objectionable when it is desired to obtain a hard and grindable yet fusible resin suitable for the preparation of molding compositions.

The chief advantage of using catalysts or condensing agents is that they render it possible to carry out the reaction at substantially lower temperatures. As an indication of the effect of such agents, the following may be stated: To obtain complete reaction between the anacardic ester and the resinous substances in the absence of catalysts or condensing agents, temperatures ranging between the approximate limits of 500° to 600° F. generally have to be used. The use of catalysts or condensing agents renders it possible to obtain substantially the same end results at approximately 400° F. This factor is of considerable importance as it permits the use of simplified reaction equipment and materially decreases the danger of localized overheating.

Various substances have been found suitable as catalysts or condensing agents. Strong mineral acids such as sulphuric or hydrochloric acid may be employed, but they should be first dissolved in a relatively large quantity of an organic solvent such as alcohols, glycols, etc. to prevent excessive condensation of the anacardic ester.

The monosulphonic acids are particularly well adapted for use as catalysts or condensing agents. They appear to be initially milder than the mineral acids, though ultimately just as powerful and effective in their catalytic action. As examples of sulphonic acids which have been found suitable may be mentioned the ethyl sulphonic and the phenyl sulphonic acids.

Excellent results have been attained using neutral esters of strong mineral acids. The neutral esters are initially possessed of substantially zero catalytic activity, but under the influence of heat and moisture they undergo a progressive hydrolysis liberating strongly acidic substances which are effective catalysts or condensing agents. It follows, therefore, that these catalytic agents before they attain their maximum catalytic activity become uniformly distributed throughout the reaction mixture, thus assuring a smooth and readily controlled reaction which results in ultimate products having a uniform and homogeneous character. As an example of a suitable ester for use as a catalyst or condensing agent may be mentioned diethyl sulphate.

The reaction, whether or not a catalyst or condensing agent is used, may advantageously be carried out in a reaction vessel which is provided with a suitable form of agitator and which can be heated to a high temperature (600° F.).

The initial or intermediate products which are formed by the reaction may be caused to react, condense or polymerize further by means of heat with or without additional reagents, catalysts, condensing agents, or hardening agents. As suitable hardening agents may be mentioned paraldehyde, hexamethylenetetramine (hexa), various addition products of hexa such as mono-hexa-oxalate, mono-hexa-phthalate or mixtures of two or more of said materials. A blend of hardening materials which has been found eminently suitable contains mono-hexa-oxalate, mono-hexa-phthalate and a-nitro-naphthalene.

Another substance which has proved exceptionally effective as a hardening agent is a keto-butanol resin made by first condensing a ketone such as acetone with an aldehyde such as formaldehyde in the presence of an alkaline condensing agent and then condensing the product further in the presence of an acid catalyst.

The hardening agents may be incorporated with the initial or intermediate reaction product in various ways. When keto-butanol resin is employed as the hardening agent, it may be fused in with the hot reaction mixture. In the case of the other hardening agents, they may advantageously be mixed with the cold ground reaction product.

Several illustrative methods will now be given for making a hard, grindable fusible resin particularly suitable for the preparation of a molding composition.

*Example I*

A phenol-aldehyde resin of the permanently fusible type such as that known as "Durite No. 291" is mixed with a half part of hot crude anacardic ester and the temperature of the mixture is slowly increased until the neighborhood of 550° F. is reached. The reaction mixture is kept at this temperature for a few minutes, then cooled somewhat and poured into cooling trays. When the mass becomes cold, it may be readily ground, after which it may be mixed with a suitable hardening agent such as those which have already been enumerated. If the keto-butanol resin is used as the hardening agent, it may advantageously be fused into the reaction mass in the manner described under Example II.

*Example II*

One part of crude anacardic ester is heated to a temperature of between 250° to 350° F. and then there are added two parts of a phenol-aldehyde resin of the permanently fusible type such as that known as "Durite No. 291." The mass is continuously stirred and the temperature is gradually brought up to about 550° F., kept at this temperature for about ten minutes and then, still with continued stirring allowed to drop to about 300° F. At this point one part of a hardening agent such as the keto-butanol resin previously described is added and permitted to fuse and become incorporated into the mass. The homogeneous product that results is then poured into pans and after it has cooled sufficiently is ground.

Example III

One part of crude anacardic ester is heated to approximately 300° F., approximately one and a half parts of gum accroides is added and the temperature is gradually raised to about 550° F. The temperature is kept at about this level for a short period and then the product is poured. After the product cools it is ground and incorporated with suitable hardening agents such as have already been enumerated. If the keto-butanol resin is used for this purpose, it is preferably added before the pouring step in the manner described under Example II.

Example IV

One part of crude anacardic ester is heated to about 300° F. and then about three quarters of a part of "Durite No. 291" is fused in. Then there is added approximately one part of gum accroides or dragon's blood. The temperature is then gradually raised to 550° F. with constant stirring and the temperature maintained at about this level for a few minutes. The mass is then ready for pouring and for the incorporation of a suitable hardening agent.

The crude anacardic ester used in the above examples may be made, as has been stated, by esterifying cashew nut shell liquid. Instead of the crude ester, a pure ester may be used. As suitable esters for use in making the reaction products of the present invention may be mentioned the methyl, ethyl, amyl, butyl, propyl and iso-propyl esters of anacardic acid. Two or more of the esters may be blended before they are reacted with the resinous material, or two or more initial or intermediate reaction products of different esters may be blended and the reaction carried to a further stage of condensation or polymerization.

The methods given in the foregoing examples may be further varied by adding catalysts or condensing agents to the reaction mixture. As has already been stated, the use of catalysts or condensing agents renders it unnecessary to employ temperatures above 400° F.

It should be noted at this point that the reaction product of an anacardic ester and a resinous substance differs radically in both chemical and physical respects from a simple physical mixture of the two materials. The reaction product is a completely uniform and homogeneous substance and reacts smoothly with hardening agents to produce superior ultimate infusible products. In the case of the simple physical mixture the hardening agent reacts with the individual ingredients at somewhat different rates giving rise to heterogeneous products wherein distinct types of hardened resins are mingled with each other in coarse intermixture.

The products of the present invention have many desirable properties in common with the reaction products of cashew nut shell liquid described in my concurrently filed application. Thus, in their final infusible stage they possess exceptional mechanical and dielectric strength, durability, toughness, flexibility, resistance to shock and resistance to moisture and various chemicals. In common with the cashew nut shell liquid reaction products, they are suitable for a wide range of useful applications in the industries including the preparation of coating materials such as varnishes, lacquers, etc., adhesives and cements for various purposes, impregnating agents as in the manufacture of laminated fabrics, and molding compositions for the manufacture of various shaped or fabricated articles. Likewise, the compositions are suitable for either hot or cold molding and may be incorporated with fillers, plasticizers and other modifying ingredients. As specific examples of articles which may be made in whole or in part of the compositions of the present invention may be mentioned abrasive wheels, noiseless gears, phonograph records, printing plates, brake linings, containers, doctor blades, electrical insulation, etc.

The chief advantage of the present invention is that it not only increases the possible number of raw materials indefinitely, but it also renders it possible to produce products varying through a wide range in certain of their properties. This provides a means for predetermining by the choice of ester the suitability of the resultant product for a given purpose. Thus, products may be readily produced having desired fusing points or degrees of plasticity, or having physical characteristics rendering them particularly suitable for some specific purpose, as for instance, for mechanical, electrical and cold punching work, for the manufacture of materials which have unusually high dielectric strengths, etc.

It may be stated that the anacardic ester-resin interaction products are very useful in the molding powder field where they show to good advantage due to the high flow possessed by this type of resin body. This latter quality of good flow and good fusibility permits the use of a greater quantity of filler for one and the same rate of flow and has the effect of increasing the time period for the intermediate plastic stages from initial fusibility to final infusibility. Further these materials appear to be particularly adapted for extrusion molding, especially where the material is kept for a considerable length of time in a pressure reservoir from which it is automatically extruded into heated molds.

It may also be stated that the anacardic ester-resin reaction products when used in conjunction with the keto-butanol resinous hardening agent yields products that are suitable for the making of casting resins of marked toughness. The feature which makes possible their use for casting resins is the fact that when using the resinous keto-butanol product no water or ammonia is evolved, nor does gassing take place, thus minimizing the tendency towards the setting up of internal strains or the production of faults, cracks, splits, etc. Furthermore, it has been found that these anacardic ester-resin reaction products when using the keto-butanol resinous hardening material may be cast and subjected to partial cure when they yield a product that is still in the plastic stage and in this stage the product may be molded under pressure, etc.

It may further be stated that the products of the present invention may be mixed with other materials such as other synthetic resins, rubber, etc. to impart to them certain desirable properties such as toughness, flexibility, resistance to oil, superior thermal stability, resistance to electric arc, etc.

It is to be understood that the foregoing disclosure is intended to be illustrative rather than restrictive, and that no limitations are to be imported which are not required by the language of the appended claims and the state of the prior art. It is to be further understood that the invention is not dependent upon any explanations or theories which have been set forth as descriptive of the actions involved, nor dependent upon the soundness or accuracy of any theoretical statements so advanced.

I claim:

1. As a composition of matter, the reaction product of a permanently fusible resin containing a reactive phenolic hydroxyl group and an ester of anacardic acid.

2. As a composition of matter, the reaction product of a permanently fusible resin of the phenol-aldehyde type and an ester of anacardic acid.

3. As a composition of matter, the reaction product of a permanently fusible natural resin containing a reactive phenolic hydroxyl group and an ester of anacardic acid.

4. As a composition of matter, the reaction product of a phenol alcohol and an ester of anacardic acid.

5. A potentially reactive resinous composition containing the reaction product of a permanently fusible resin having a reactive phenolic hydroxyl group and an ester of anacardic acid, and a hardening agent.

6. A potentially reactive resinous composition containing the reaction product of a permanently fusible resin having a reactive phenolic hydroxyl group and an ester of anacardic acid, and a hardening agent selected from a group consisting of paraldehyde, hexamethylenetetramine, hexamethylenetetramine addition products and ketobutanol resin.

7. The method of making a synthetic resin which consists in reacting a mixture containing one or more esters of anacardic acid and a permanently fusible resin containing a reactive phenolic hydroxyl group in the absence of appreciable amounts of free aldehydes.

8. The method of making a synthetic resin which consists in reacting a mixture containing one or more esters of anacardic acid and a permanently fusible resin containing a reactive phenolic hydroxyl group in the absence of appreciable amounts of free aldehydes and in the presence of catalysts.

9. The method of making a synthetic resin which consists in reacting a mixture containing one or more esters of anacardic acid and a permanently fusible resin containing a reactive phenolic hydroxyl group in the absence of appreciable amounts of free aldehydes and in the presence of catalysts selected from a group consisting of sulphuric acid, ethyl sulphonic acid, phenyl sulphonic acid and diethyl sulphate.

10. The method of making a synthetic resin which consists in reacting a mixture containing one or more esters of anacardic acid and a permanently fusible resin containing a reactive phenolic hydroxyl group in the absence of appreciable amounts of free aldehydes and in the presence of neutral esters of strong mineral acids.

11. As a composition of matter, the reaction product of an ester of anacardic acid with gum accroides.

12. A potentially reactive resinous composition containing the reaction product of an ester of anacardic acid with gum accroides in homogeneous admixture with a hardening agent.

13. The method of making a synthetic resin which consists in reacting a mixture containing one or more esters of anacardic acid and a resin containing a reactive phenolic hydroxyl group under controlled reaction conditions.

14. The method of making a synthetic resin which consists in reacting a mixture containing one or more esters of anacardic acid and a phenol-aldehyde reaction product under controlled reaction conditions.

EMIL E. NOVOTNY.